United States Patent
Liao

(10) Patent No.: US 10,124,487 B2
(45) Date of Patent: Nov. 13, 2018

(54) INTELLIGENT ROBOT WITH DIFFERENT ACCOUTERMENTS

(71) Applicant: ScienBiziP Consulting (Shenzhen) Co., Ltd., Shenzhen (CN)

(72) Inventor: Chia-Hung Liao, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 108 days.

(21) Appl. No.: 15/252,712

(22) Filed: Aug. 31, 2016

(65) Prior Publication Data

US 2017/0334065 A1 Nov. 23, 2017

(30) Foreign Application Priority Data

May 20, 2016 (TW) .............................. 105115709 A

(51) Int. Cl.
  *B25J 9/16* (2006.01)
  *B25J 11/00* (2006.01)
  *B25J 13/08* (2006.01)

(52) U.S. Cl.
  CPC ............ *B25J 9/161* (2013.01); *B25J 11/003* (2013.01); *B25J 11/0005* (2013.01); *B25J 11/008* (2013.01); *B25J 13/08* (2013.01)

(58) Field of Classification Search
  CPC ...... B25J 9/1602; B25J 9/161; B25J 11/0005; A63H 3/52; A43B 3/28
  See application file for complete search history.

(56) References Cited

U.S. PATENT DOCUMENTS

2003/0078696 A1\* 4/2003 Sakamoto ................ A63H 3/52
  700/245
2016/0250752 A1\* 9/2016 Djugash ................... B25J 13/00
  700/264

OTHER PUBLICATIONS

TheDisneyDude55, "Toy Story 3 Playtime Sheriff Woody (With Interactive Cowboy Hat) Review," Jun. 2010, https://www.youtube.com/watch?v=AllQc0ATak4 (Year: 2010).\*

\* cited by examiner

*Primary Examiner* — Spencer D Patton
(74) *Attorney, Agent, or Firm* — ScienBiziP, P.C.

(57) ABSTRACT

An intelligent robot includes different accouterments. The intelligent robot includes a robot body and a number of accouterments working together with the robot body. The robot body includes a central control module and a number of functional modules corresponding to the number of accouterments. The number of accouterments can be defined in different types and functions. Thus, the intelligent robot can display different functions and provide value-added service.

11 Claims, 5 Drawing Sheets

INTELLIGENT ROBOT WITH DIFFERENT ACCOUTERMENTS

CROSS-REFERENCE TO RELATED APPLICATIONS

This application claims all benefits accruing under 35 U.S.C. § 119 from Taiwan Patent Application No. 105115709, filed on May 20, 2016, in the Taiwan Intellectual Property Office, the contents of which are hereby incorporated by reference.

FIELD

The subject matter herein generally relates to intelligent robots, particularly, to an intelligent robot with different accouterments.

BACKGROUND

Intelligent robot need more and more sensors in order to be more and more intelligent. Therefore, more and more conductive wires are needed to connect the sensors. However, it is difficult to install more and more conductive wires on the body of the intelligent robot. Furthermore, it is complicated for repairing the intelligent robot when some sensors are broken.

Recently, the sensors and the accouterment are integrated to form a tactile sensor accouterment. However, the tactile sensor accouterment is only used as a sensor.

What is needed, therefore, is to provide an intelligent robot which can overcome the shortcomings as described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
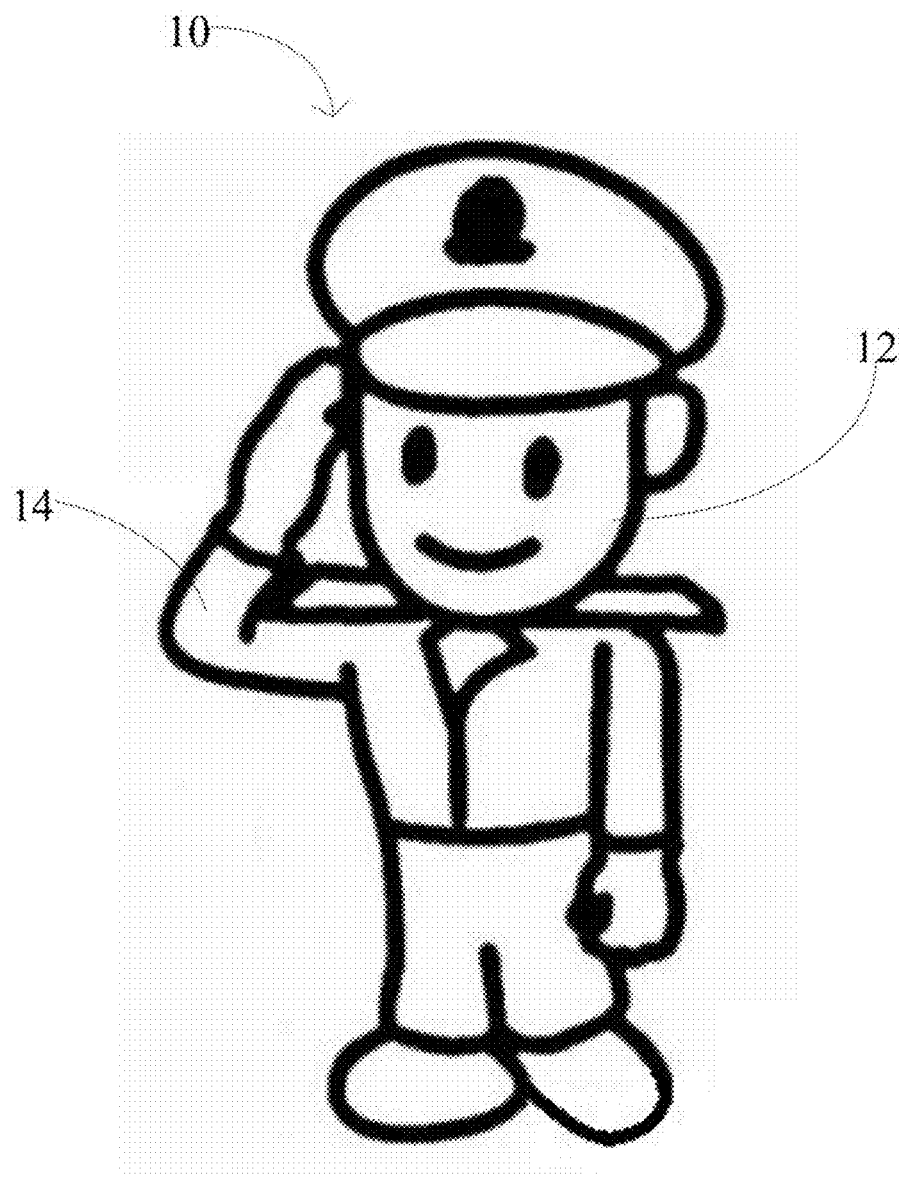
FIG. 1 is a schematic view of one embodiment of an intelligent robot.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "inside" indicates that at least a portion of a region is partially contained within a boundary formed by the object. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Figure 2:
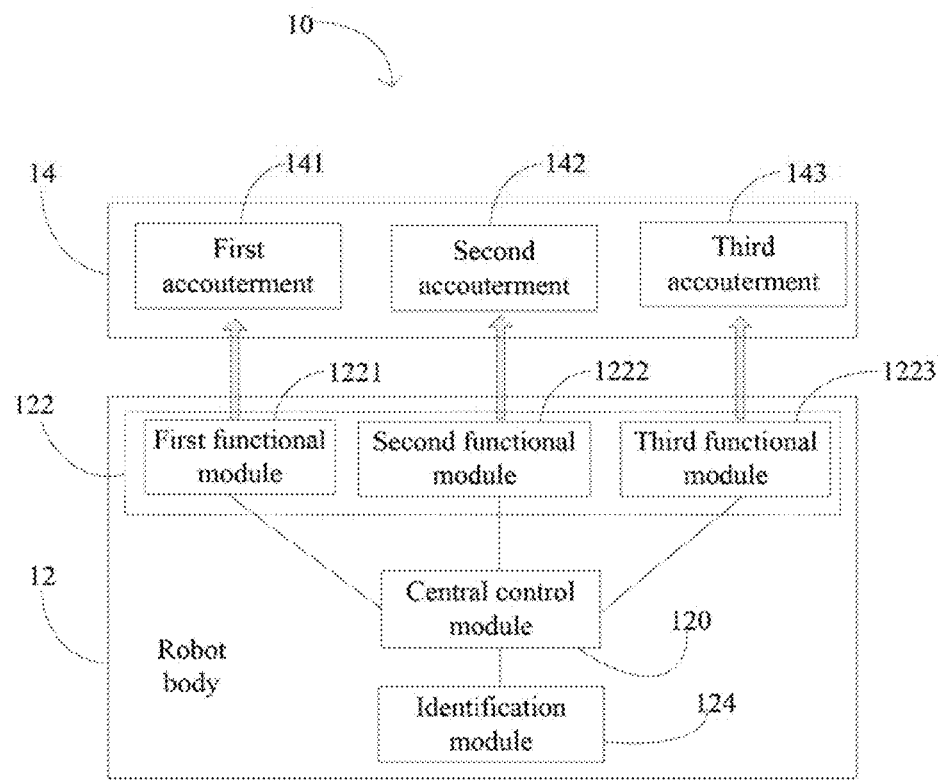
FIG. 2 is a functional diagram of one embodiment of the intelligent robot.

Referring to FIGS. 1-2, an intelligent robot 10 of this disclosure is provided. The intelligent robot 10 includes a robot body 12 and a plurality of accouterments 14. In works, the robot body 12 is costumed with one of the plurality of accouterments 14. In one embodiment, the robot body 12 is costumed with a police uniform.

The appearance and size of the robot body 12 are not limited and can be selected according to need. In one embodiment, the robot body 12 has human appearance and includes arms, legs, head and so on. The robot body 12 includes a shell, a hardware inside the shell, and a software run by the hardware. The hardware can include one or more sensors, displays or speakers. The sensor can be an image sensor, a pressure sensor, a light sensor, a magnetic field sensor, or a sound sensor. In one embodiment, the image sensor is a camera, the sound sensor is a microphone, the display is a liquid crystal display. The software includes a central control module 120 and a plurality of functional modules 122 corresponding to the plurality of accouterments 14. The central control module 120 is electrically connected to the plurality of functional modules 122. When the robot body 12 is costumed with one of the plurality of accouterments 14, the intelligent robot 10 enter a work mode controlled by the corresponding one of the plurality of functional modules 122. The software can also includes an image identification and processing module, and a sound identification and processing module.

In one embodiment, each of the plurality of accouterments 14 includes an identity (ID) module (not shown), and the robot body 12 includes an identification module 124. When the robot body 12 is costumed with one of the plurality of accouterments 14, the identification module 124 would be automatically coupled to the ID module of the accouterment 14. The identification module 124 is configured to read the ID information of the ID module of the accouterment 14 and activate the corresponding one of the plurality of functional modules 122 according to the ID information.

In one embodiment, the robot body 12 includes a first connector electronically connected to the identification module 124. Each accouterment 14 includes a second connector electronically connected to the ID module. The first connector and the second connector would be coupled with each other when the robot body 12 is costumed with one of the plurality of accouterments 14. The first connector and the second connector can be metal holes and metal pins matched with each other, or metal plates and metal dots matched with each other.

In one embodiment, the robot body 12 includes a first wireless communication module electronically connected to the identification module 124. The accouterment 14 includes a second communication module electronically connected to the ID module and matched with the first wireless communication module. When the robot body 12 is costumed with one of the plurality of accouterments 14, the identification module 124 and the ID module of the accouterment 14 would be electronically connected to each other by the first wireless communication module and the second wireless communication module. The first wireless communication module and the second wireless communication module can be bluetooth communication module, infrared communication module, Wifi communication module or radio frequency identification (RFID) communication module.

The intelligent robot 10 can further include a controller configured for the user to control the robot body 12 to act according to the accouterment 14 by switching between the plurality of functional modules 122. The controller can be a button, a touch screen, a touch panel or a touch pad installed on the robot body 12. The controller can be a remote device such as a remote control, a cell phone, or a tablet computer.

The style of the accouterment 14 is not limited and can be selected according to need. The accouterment 14 can include coat, trousers, skirt, hat, or shoes. The accouterment 14 is not limited to the human clothing, and can also be a mascot costume or any wearable device. The material of the accouterment 14 is not limited and can be cotton, nylon, leather, fiber, metal, carbon, or polymer.

The accouterment 14 can include zipper, button or velcro so that the accouterment 14 can be put on or taken off easily. The accouterment 14 can be elastic so that to be firmly fixed on the robot body 12. The accouterment 14 can include a plurality of sensors and pockets for carrying the plurality of sensors. The pocket can also include zipper, button or velcro for fixing the sensors therein. The accouterment 14 can include a plurality of conductive wires spin or woven together with the fibers of the accouterment 14.

The plurality of accouterments 14 can be different functional working dress, different uniform for different roles, or different mascot costume. The different functional working dress can include working one or more sensors such as a temperature sensor, a pressure sensor, a gas sensor, a magnetic field sensor or a light sensor. The robot body 12 further includes a data collecting and processing module configured to control the working sensors to collect data and process the data obtained by the working sensors. The data collecting and processing module can be a temperature collecting and processing module, a pressure collecting and processing module, a gas collecting and processing module, a magnetic field collecting and processing module or a light collecting and processing module. When the plurality of accouterments 14 are different uniforms for different roles, the plurality of functional modules 122 includes a sound simulation module and an action simulation module configured to control the intelligent robot 10 to simulate the sound and action of the roles. When the plurality of accouterments 14 are different mascot costumes, the plurality of functional modules 122 includes a sound simulation module and an action simulation module configured to control the intelligent robot 10 to simulate the sound and action of the mascot.

The plurality of accouterments 14 can be defined in different types and functions. Thus, the intelligent robot 10 can display different functions and provide value-added service.

Different examples of the intelligent robot 10 are provided below.

EXAMPLE 1

Figure 3:
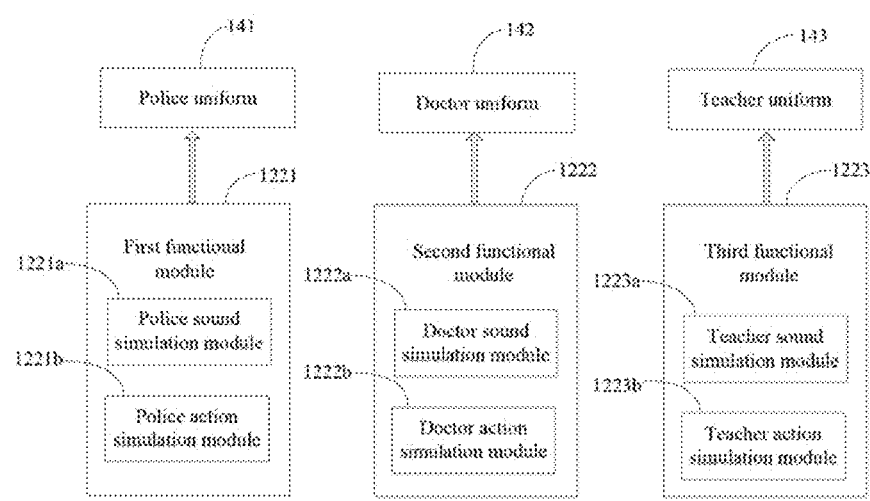
FIG. 3 is a functional diagram of example 1 of the intelligent robot.

Referring to FIGS. 1-3, the intelligent robot 10 of example 1 includes a robot body 12 having human appearance and three accouterments 14 for different roles. The first accouterment 141 is a police uniform. The second accouterment 142 is a doctor uniform. The third accouterment 143 is a teacher uniform. The robot body 12 includes three functional modules 122. The first functional module 1221 includes a police sound simulation module 1221a and a police action simulation module 1221b configured to control the intelligent robot 10 to simulate the sound and action of policeman. The second functional module 1222 includes a doctor sound simulation module 1222a and a doctor action simulation module 1222b configured to control the intelligent robot 10 to simulate the sound and action of doctor. The third functional module 1223 includes a teacher sound simulation module 1223a and a teacher action simulation module 1223b configured to control the intelligent robot 10 to simulate the sound and action of teacher. When the robot body 12 is costumed with the police uniform 141, the intelligent robot 10 can simulate the sound of policeman such as "Put your hands in the air!", or action of policeman such as salute. When the robot body 12 is costumed with the doctor uniform 142, the intelligent robot 10 can simulate the sound of doctor such as "What ails you?", or action of doctor such as injection. When the robot body 12 is costumed with the teacher uniform 143, the intelligent robot 10 can simulate the sound of teacher such as "Good morning class!", or action of teacher such as writing on blackboard. The intelligent robot 10 of example 1 can be used as an amusement robot to accompany or play with kids. The intelligent robot 10 of example 1 can also be used as a working robot to take care of patient such as to take body temperature when the doctor uniform includes an infrared sensor.

EXAMPLE 2

Figure 4:
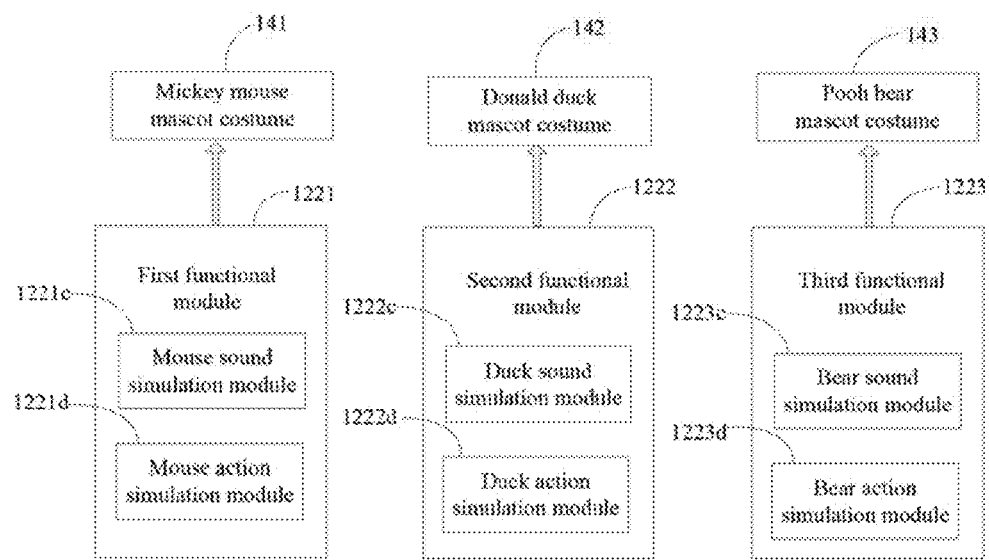
FIG. 4 is a functional diagram of example 2 of the intelligent robot.

Referring to FIG. 4, the intelligent robot 10 of example 2 is similar with the intelligent robot 10 of example 1 except that the first accouterment 141 is a Mickey mouse mascot costume, the second accouterment 142 is a Donald duck mascot costume, and the third accouterment 143 is a Pooh bear mascot costume. The robot body 12 includes three functional modules 122. The first functional module 1221 includes a mouse sound simulation module 1221c and a mouse action simulation module 1221d configured to control the intelligent robot 10 to simulate the sound and action of Mickey mouse. The second functional module 1222 includes a duck sound simulation module 1222c and a duck action simulation module 1222d configured to control the intelligent robot 10 to simulate the sound and action of Donald duck. The third functional module 1223 includes a bear sound simulation module 1223c and a bear action simulation module 1223d configured to control the intelligent robot 10 to simulate the sound and action of Pooh bear. When the robot body 12 is costumed with the mascot costume, the intelligent robot 10 can simulate the sound and action of mascot such as talking, singing, dancing or doing classic cartoon action. The intelligent robot 10 of example 1 can be used as an amusement robot to accompany or play with kids or for business performance.

EXAMPLE 3

Figure 5:
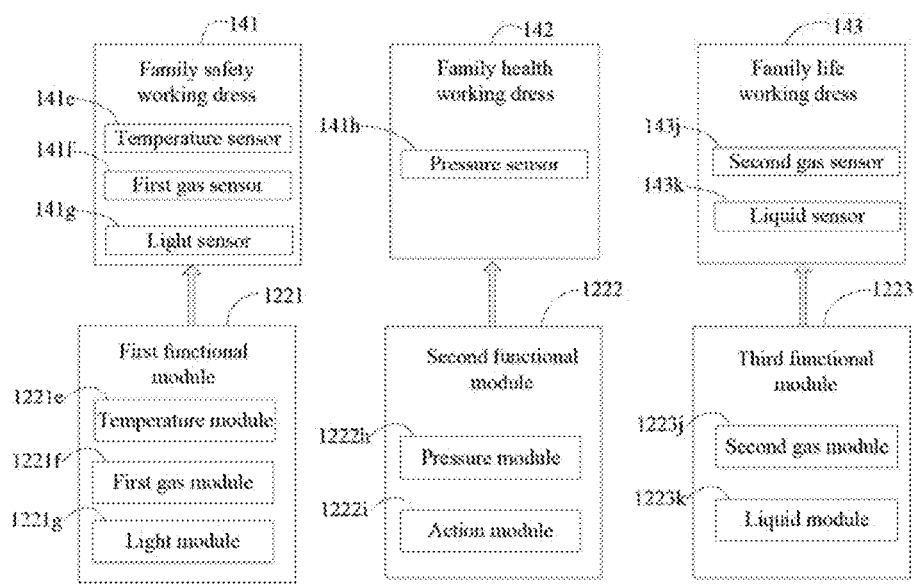
FIG. 5 is a functional diagram of example 3 of the intelligent robot.

Referring to FIG. 5, the intelligent robot 10 of example 3 is similar with the intelligent robot 10 of example 1 except that the first accouterment 141 is a family safety working dress 141, the second accouterment 142 is a family health working dress 142, and the third accouterment 143 is a family life working dress 143. The robot body 12 also includes an image sensor, a sound sensor, an image display, a speaker, an image collecting and processing module, and a sound collecting and processing module.

The family safety working dress 141 includes a temperature sensor 141e, a first gas sensor 141f, and a light sensor 141g. The first functional module 1221 includes a temperature module 1221e configured to control the temperature sensor 141e to work and process the temperature data, a gas module 1221f configured to control the first gas sensor 141f to work and process the gas data, and a light module 1221g configured to control the light sensor 141g to work and process the light data. When the intelligent robot 10 detect an abnormal signal such as high temperature, smoke, fire or stranger, the first functional module 122122 control the intelligent robot 10 to alarm.

The family health working dress 142 includes a pressure sensor 142h. The second functional module 1222 includes an action module 1222i and a pressure module 1222h. The action module 1222i is configured to control the intelligent robot 10 to massage such as scratching, pounding, or pressing. The pressure module 1222h is configured to control the pressure sensor 142h to work and process the pressure data. For example, when the intelligent robot 10 receive a command of "pounding back", the intelligent robot 10 will pound user's back. When the intelligent robot 10 receive a command of "more slightly", the intelligent robot 10 will decrease the weight by the pressure sensor 142h.

The family life working dress 143 includes a second gas sensor 143j and a liquid sensor 143k. The third functional module 1223 is configured to control the intelligent robot 10 to take care of baby. The third functional module 1223 includes a second gas module 1223j configured to control the second gas sensor 143j to work and process the gas data, and a liquid module 1223k configured to control the liquid sensor 143k to work and process the light data. For example, when the intelligent robot 10 detect a cry sound, the intelligent robot 10 will play a music. When the intelligent robot 10 detect a stink by the gas sensor, the intelligent robot 10 will remind user that the baby had poo. When the intelligent robot 10 detect a liquid on the bottom, the intelligent robot 10 will remind user that the baby had pee.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. An intelligent robot comprising:
   a robot body, wherein the robot body comprises an image sensor, a sound sensor, an image display, a speaker, an image collecting and processing module, and a sound collecting and processing module; and
   a plurality of accouterments, wherein the robot body comprises a central control module and a plurality of functional modules corresponding to the plurality of accouterments;
   wherein the plurality of accouterments comprises:
      a family safety working dress;
      a family health working dress; and
      a family life working dress;
   wherein the plurality of functional modules comprises:
      a first functional module corresponding to the family safety working dress;
      a second functional module corresponding to the family health working dress; and
      a third functional module corresponding to the family life working dress;
   wherein the family safety working dress comprises a temperature sensor, a first gas sensor, and a light sensor; the first functional module comprises a temperature module configured to control the temperature sensor to work and process a temperature data, a gas module configured to control the first gas sensor to work and process a first gas data, and a light module configured to control the light sensor to work and process a light data; when the intelligent robot detects an abnormal signal selected from the group consisting of high temperature, smoke, fire and stranger, the first functional module controls the intelligent robot to alarm;
   wherein the family health working dress comprises a pressure sensor; the second functional module comprises an action module and a pressure module; the action module is configured to control the intelligent robot to massage; the pressure module is configured to control the pressure sensor to work and process a pressure data; when the intelligent robot receives a command of "pounding back" of an user, the intelligent robot pounds the user's back; and when the intelligent robot receives a command of "more slightly", the intelligent robot decreases the force with which the intelligent robot pounds on the user's back; and
   wherein the family life working dress comprises a second gas sensor and a liquid sensor; the third functional module is configured to control the intelligent robot to take care of a baby; the third functional module comprise a second gas module configured to control the second gas sensor to work and process the second gas data, and a liquid module configured to control the liquid sensor to work and process a liquid data when the intelligent robot detects a cry sound of the baby, the intelligent robot plays a music; and when the intelligent robot detects a defecation odor by the second gas sensor, the intelligent robot reminds the user that the baby defecated, when the intelligent robot holds the baby and the liquid sensor detects a liquid on the bottom, the intelligent robot reminds the user that the baby urinated.

2. The intelligent robot of claim 1, wherein each of the plurality of accouterments comprises an identity (ID) module, and the robot body comprises an identification module configured to read ID information of the ID module and activate corresponding one of the plurality of functional modules according to the ID information.

3. The intelligent robot of claim 2, wherein when the robot body is costumed with one of the plurality of accouterments, the identification module is automatically coupled to the ID module of the one of the plurality of accouterments.

4. The intelligent robot of claim 3, wherein the robot body comprises a first connector electronically connected to the identification module, and each of the plurality of accouterments comprises a second connector electronically connected to the ID module; the first connector and the second connector are coupled with each other when the robot body is costumed with one of the plurality of accouterments.

5. The intelligent robot of claim 4, wherein the first connector and the second connector are metal holes and metal pins matched with each other, or metal plates and metal dots matched with each other.

6. The intelligent robot of claim 3, wherein the robot body comprises a first wireless communication module electronically connected to the identification module, and each of the plurality of accouterments comprises a second communication module electronically connected to the ID module and matched with the first wireless communication module.

7. The intelligent robot of claim 6, wherein the first wireless communication module and the second wireless communication module are bluetooth communication modules, infrared communication modules, Wifi communication modules or radio frequency identification communication modules.

8. The intelligent robot of claim 1, further comprising a controller configured to control the robot body to act according to one of the plurality of accouterments by switching between the plurality of functional modules.

9. The intelligent robot of claim 8, wherein the controller is a touch screen installed on the robot body.

10. The intelligent robot of claim 8, wherein the controller is a remote control, a cell phone, or a tablet computer.

11. The intelligent robot of claim 1, wherein each of the plurality of accouterments comprises at least one of coat, trousers, skirt, hat, and shoes.

* * * * *